INVENTOR.
Waldemar T. Rentschler
BY
Arthur A. March
ATTORNEY

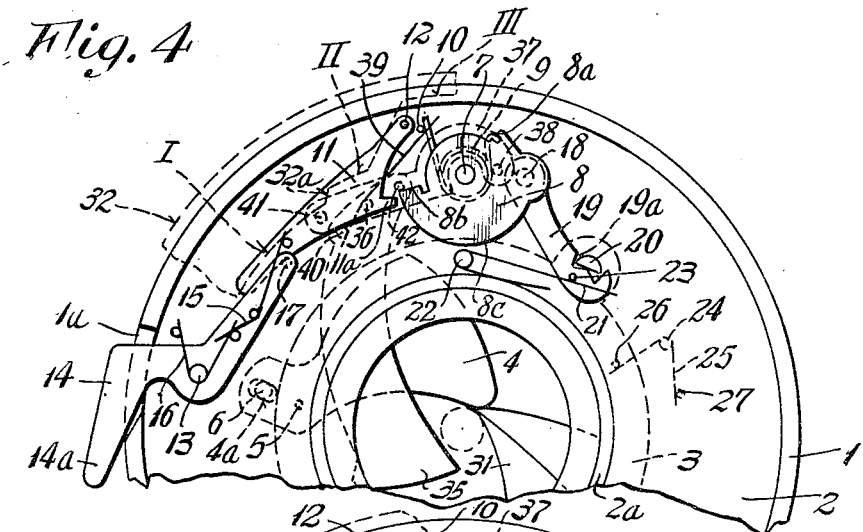
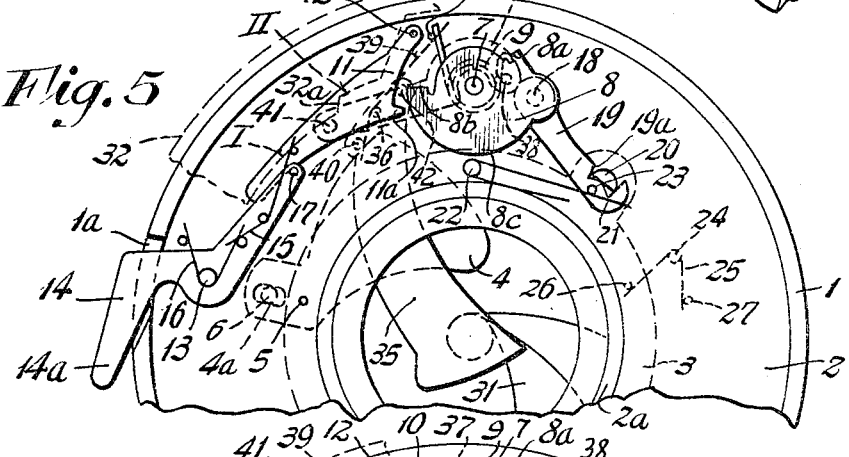
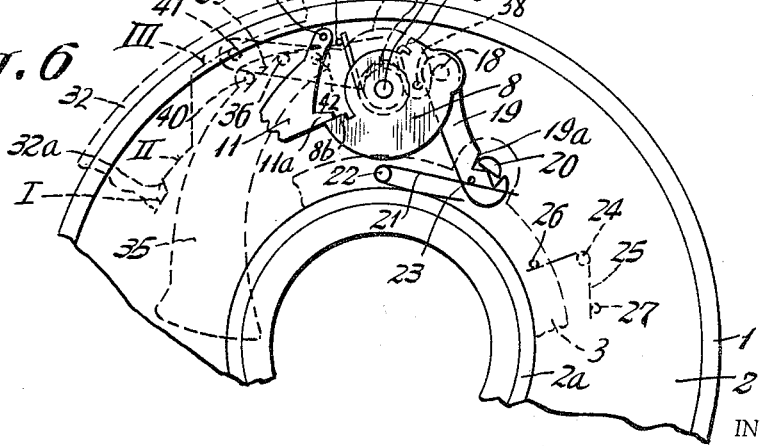

Oct. 18, 1966 W. T. RENTSCHLER 3,279,346
PHOTOGRAPHIC INTRA-LENS SHUTTER
Filed Sept. 27, 1963 3 Sheets-Sheet 3

INVENTOR.
Waldemar T. Rentschler
BY
Arthur A. March
ATTORNEY

United States Patent Office 3,279,346
Patented Oct. 18, 1966

3,279,346
PHOTOGRAPHIC INTRA-LENS SHUTTER
Waldemar T. Rentschler, Calmbach (Enz), Germany, assignor to Alfred Gauthier, G.m.b.H., Calmbach (Enz), Germany, a corporation of Germany
Filed Sept. 27, 1963, Ser. No. 312,089
Claims priority, application Germany, Oct. 2, 1962, G 36,055
11 Claims. (Cl. 95—64)

This invention relates to a photographic shutter mechanism with independent controls for setting the diaphragm and the exposure time. In particular, the invention relates to a shutter mechanism having means for producing exposures of extremely short duration when the mechanism is set for the smallest diaphragm aperture.

One of the principal objects of this invention is to provide a simple shutter mechanism with a large exposure-value setting range suitable for use with regular and supersensitive film material.

In accordance with the present invention, the shutter mechanism includes means connected to the diaphragm aperture control to be controlled thereby so that when the diaphragm aperture control is moved beyond the point at which the aperture is reduced to its smallest size, the means will become operative to shorten the exposure to a shorter duration than is possible for larger aperture sizes. The foregoing means may be an extra shutter blade of a size just sufficient to cover a very small aperture, the extra blade being operated to cover the aperture very shortly after the normal shutter blades uncover it, and in less time than the motion of the main shutter blades can be reversed by the driving mechanism. This extra blade may be operated by the same driving member that operates the main shutter blades.

As an alternative, the extra blade may have an aperture of limited size that uncovers the diaphragm aperture and covers it up again after a very short interval. This limited aperture may be so shaped that by varying the path of motion of the extra blade—for example, by varying the axis of a pivot pin that supports the extra blade—the duration of the short interval may be changed.

In either of the foregoing embodiments of the extra shutter blade may be mounted on a lever, the position of which can be influenced by the diaphragm control. When the control is set at one of the usual diaphragm values, the extra blade may be kept out of the way by a pin or attachment which is located outside the path of motion of a driving device that is part of the driving mechanism for the shutter blades. The pin is moved into the path of motion of the driving device when the diaphragm control is set to an additional section of its scale beyond the usual range of values.

Another feature of the invention consists in having the extra blade spring biased to engage the lever on which it is mounted when the extra blade is in its starting position. This has the advantage that the spring not only causes the extra blade to engage the lever which cooperates with the diaphragm control but that it additionally helps to return the extra blade from the position covering the aperture, into which it is moved by the driving mechanism during the running-down motion of the latter in making a photographic exposure.

As a further embodiment, the main shutter blades, themselves, may be operated so as to close in a shorter interval for small aperture settings of the diaphragm than for large aperture settings. In order to do this, advantage is taken of the fact that the shutter blades do not need to swing nearly as far out to uncover a small aperture as to uncover a large one. By connecting the blades through a suitable linkage to the diaphragm aperture control, their movement may be constrained to a small amount when the diaphragm control is moved beyond the point at which the smallest aperture size is indicated.

In order to make sure that the exposure time, or shutter speed, control is properly set at the time the special high speed mechanism is brought into operation, a lock may be provided between the shutter speed control and the diaphragm control which will permit the latter to move into the positions beyond the smallest aperture position only when the shutter speed control is set for its highest operating speed.

The invention will be described in greater detail in the following specification together with the accompanying drawing, in which:

FIG. 4 shows a portion of the shutter mechanism of FIG. 3 after the driving mechanism has been released and with the conventional shutter blade system in its open position and with the diaphragm set for its smallest aperture;

FIG. 5 shows the shutter mechanism of FIGS. 3 and 4 with the extra shutter blade in position to cover up the aperture;

FIG. 6 shows the shutter mechanism of FIG. 3 with the extra shutter blade moved out of its operating position;

Figure 7:
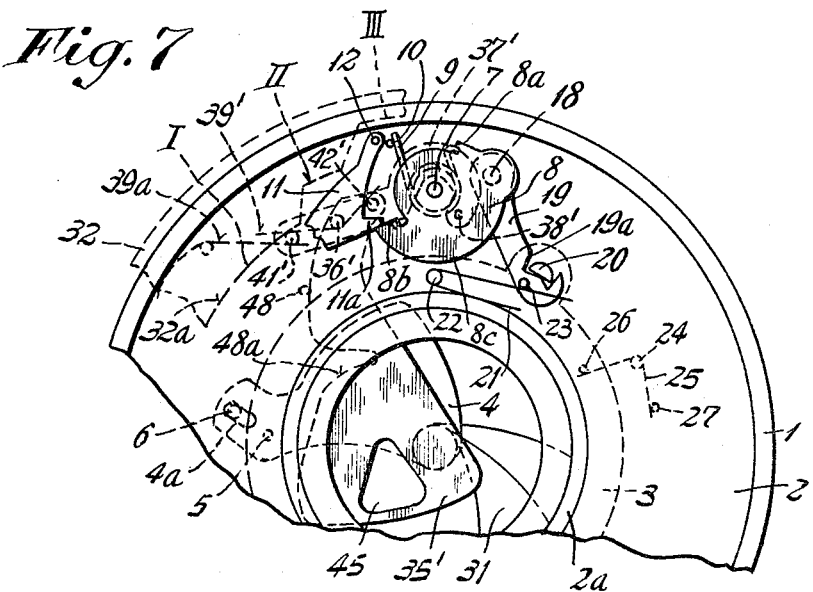
Figure 8:
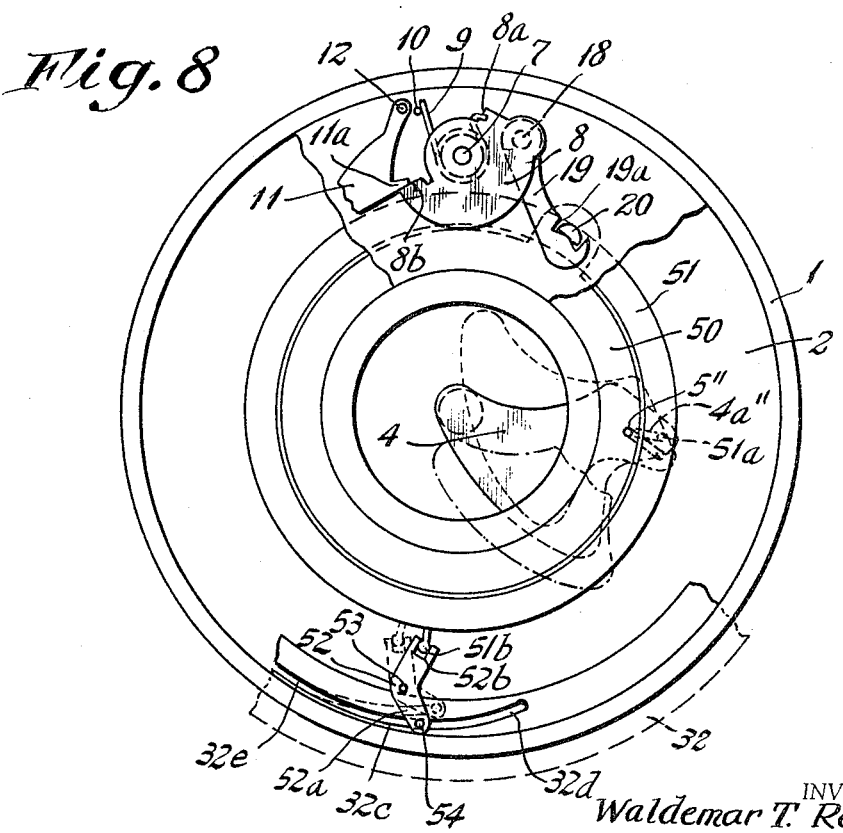

FIG. 7 shows another embodiment of the invention with an extra blade having an aperture therein and with the blade in position covering the diaphragm aperture; and FIG. 8 shows still another embodiment of the invention in which the means for producing an extremely short duration exposure comprises the regular shutter blades coupled to an additional movable pivot member controlled by the diaphragm aperture control.

Figure 3:
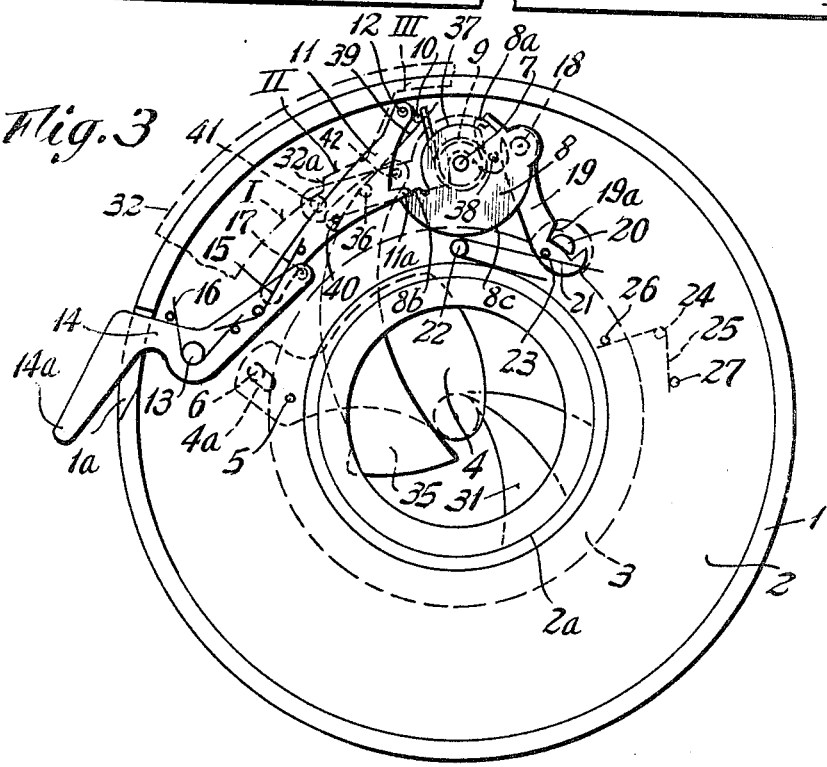
FIG. 3 shows a front view of a photographic intra-lens shutter constructed according to the invention and with driving elements of the mechanism in their starting position.

Referring first to FIG. 3 of the drawing, it will be seen that the shutter mechanism includes a housing 1 having a base plate 2 and a tubular inner wall 2a suitable for holding the lens assembly of the camera. A shutter blade driving ring 3 is rotatably mounted behind the base plate 2 to control the motion of a plurality of shutter blades 4, only one of which is shown in the drawing for reasons of clarity. The shutter blades are mounted on pivot pins 5 and are provided with pin-slot connections in the form of a slot 4a engaging a pin 6.

A shaft 7 is rotatably mounted in the base plate 2 and a driving disc 8, which is the main driving disc of the shutter mechanism to control the opening and closing movements of the shutter blades 4, is rigidly attached to one end of the shaft. In order to cock the driving the disc 8 the other end of the shaft 7 extends through the rear wall of the shutter housing and connects with a suitable device, such as the film transport control of the camera, which, being conventional, is not shown in the drawing. Motive power for operating the driving disc 8 to make a photographic exposure is furnished by a coil spring 9, one end of which engages a fixed pin 10 on the base plate 2 and the other end of which is hooked onto a projection 8a on the driving disc 8 so as to exert a force tending to rotate the driving disc in a clockwise direction. In order to hold the disc 8 in the cocked position against this force, as shown in FIG. 3, the disc is engaged by an arresting lever 11 mounted on a shaft 12 and provided with an arm 11a that extends into the path of motion of a projection 8b on the driving disc. A fixed pin 13 supports a release level 14 adjacent to the free end of the lever 11. The release lever 14 has a finger piece 14a which projects through a slot 1a to serve as the trigger for the shutter mechanism. The arresting lever 11 is biased by a spring 15 that urges the lever in the counterclockwise direction and by a spring 16 which encircles the pin 13. The spring 16 urges the release lever to rotate in the clockwise direction and both of the springs 15 and 16 bear against a pin on the release lever so that the arresting lever 11 is spring-biased with respect to the release lever 14. A pin 17 on the release lever 14 engages the arresting lever 11 to pivot the latter in the clockwise direction when the release lever is pivoted counterclockwise to make a photographic exposure.

A pin 18 on the driving disc 8 articulately supports one end of a driving pawl 19, the free end of which is shaped in the customary way so as to have coupling jaws 19a for embracing a pin 20 of semi-circular cross-section. This pin is mounted on the driving ring 3 so that movement of the pin causes movement of the shutter blades 4. The coupling jaws 19a are kept in contact with the pin 20 during the driving motion by a coil spring 21 which is mounted on a pivot pin 22 and which is formed so that is exerts pressure on the inner wall 2a and on a pin 23 mounted on the pawl 19.

Figure 1:
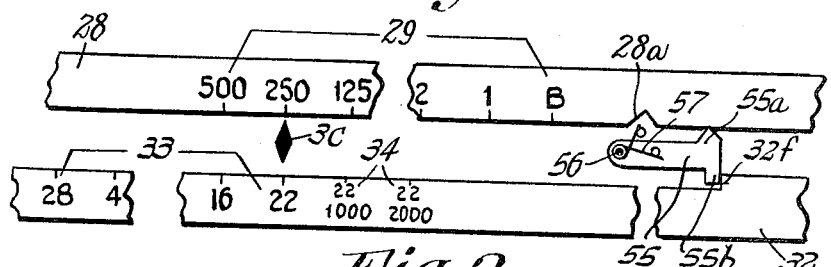
FIG. 1 shows a partial top view of the controls for diaphragm and exposure time in connection with the setting scales, the two controls being set at scale values located in the usual exposure-value setting range of the camera.
Figure 2:
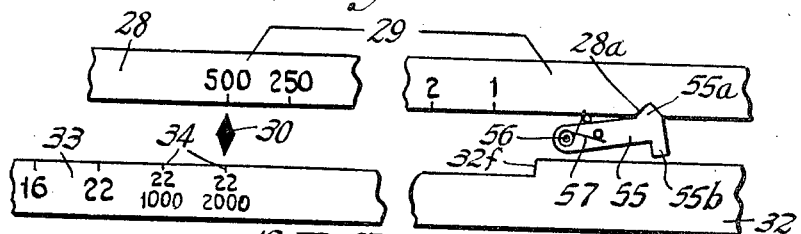
FIG. 2 shows the same arrangement as in FIG. 1 but with the diaphragm control set at a scale value in its additional exposure value setting range.

When the foregoing mechanism is operated to make photographic exposures, the driving disc 8 runs down from the cocked position shown in FIG. 3 and, during the first portion of this rotation, pushes the pawl 19 so as to rotate the ring 3 clockwise, until the shutter blades 4 has reached their open position. Beyond the midpoint of its rotation the driving disc 8 begins to pull the pawl 19 in the opposite direction and this causes the ring 3 to reverse its direction of rotation thereby swinging the shutter blades 4 back to their closed position. Subsequently, when the driving disc is recocked so as to make a new photographic exposure, the driving pawl 19 slides along the lower surface of the pin 20 without engaging or moving the pin. The jaws 19a reengage the pin 20 only at the end of the cocking process, which prevents the shutter from being reopened during cocking. A fixed pin 24 supports a spring 25 one end of which bears against a pin 26 on the ring 3 and the other end of which bears against another fixed pin 27 to bias the ring 3 so that it will tend to rotate counterclockwise in a position, corresponding to the closed position of the shutter blades. A conventional exposure time escapement mechanism (which is not shown in the drawing) may be mounted on the base plate 2 to cooperate with the driving disc 8 to delay, to a greater or lesser extent, the running-down of the disc, thereby controlling the length of time that the shutter blades 4 remain in their open position. This may also be considered as controlling the operating speed of the shutter. An exposure time, or shutter speed, control 28, part of which is shown in FIGS. 1 and 2, is used for setting the escapement mechanism for different shutter speeds. While the control 28 is shown in an apparently flat form in FIGS. 1 and 2 it is preferably in the form of a ring rotatably mounted on the tubular inner wall 2a of the base plate 2 shown in FIG. 3. The shutter speed control 28 has a scale 29 that indicates the length of time that the shutter is open and, as may be seen, the time values are between 1 second and $\frac{1}{500}$ second. There is in addition a position indicated by the mark "B" for carrying out exposures requiring a longer time than 1 second. The scale 29 is operated with reference to a fixed mark 30 which may be located wherever convenient, such as on the outer wall of the housing 1 of the shutter in FIG. 3.

The shutter mechanism also includes an iris diaphragm which may be set to different aperture sizes and which includes a plurality of lamellae 31 that are partially shown in FIG. 3. These lamellae may be set to different positions by means of a diaphragm control 32 which, like the shutter speed control 28, is preferably in the form of a ring, a fragment of which is shown in FIG. 3. The control 32 is also shown flattened out in FIGS. 1 and 2 and, as shown there, has a scale 33 with various aperture values indicated thereon between "2.8" and "22". The control 32 may be set with reference to the same fixed mark 30 as the control 28 by suitable orientation of the two controls. On the basis of the above-mentioned shutter speed and diaphragm ranges, the shutter may be considered as comprising an exposure-value setting range from "3" to "18."

In addition to the conventional setting ranges, the invention provides for an extended range associated with the diaphragm control 32. This extended range is indicated by reference character 34 and is adjacent to the normal range indicated by the scale 33. Within the extended range 34 the diaphragm remains set at an aperture of "f22" but movement of the diaphragm control 32 rather than the shutter speed control 28 changes the shutter speed to extremely short exposure times for example in the order of $\frac{1}{1000}$ or $\frac{1}{2000}$ of a second. These values are faster than any speeds that may be accomplished by normal operation of the mechanism governed by the shutter speed control 28.

According to FIGS. 3 through 6 an additional shutter blade 35 may be used in connection with the regular shutter blades 4. This shutter blade 35 comes into operation only when the diaphragm control 32 is set within the range 34, and, therefore, the blade 35 only needs to be of such size as to cover the shutter for the smallest diaphragm aperture. The blade is controlled in such a way as to close this small aperture sooner than it would be closed by the normal shutter blades 4.

The blade 35 may be pivotally mounted on a pin 36 which in turn is mounted on a lever 37. The lever pivots on a pin 38 and a spring 39 coiled about the pin 36 is placed so that one of its ends engages the fixed pin 10 while the other end is hooked over a pin 40 on the blade 35 so as to exert counterclockwise force thereon. The pressure of this spring retains the blade 35 in such a position that it normally does not cover the small aperture when the control 32 is set at "f22." In this position the supporting lever 37 is located as shown in FIG. 3 so that a pin 41 is pressed against a cam 32a on the diaphragm control 32. The pin 40 on the shutter blade 35 rests against one edge of the lever 37.

The cam 32a has three sections in the form of steps I, II and III. Step I is brought into position adjacent to the pin 41 when the shortest exposure time, about $\frac{1}{2000}$ second, is desired; step II is brought into the same relative position by rotation of the control 32 when an exposure of $\frac{1}{1000}$ second is desired; and step III is brought into the same angular position when the control 32 is set to any of the diaphragm values in scale 33.

In addition to the regular shutter blades 4, the driving disc 8 also operates the blade 35, the latter by means of a projection 8b that engages a pin 42 on the blade 35. When exposure times of $\frac{1}{2000}$ or $\frac{1}{1000}$ second are to be employed, the blade 35 must be in such a position that the pin 42 is in the path of motion of the projection 8b. In such a case, if the disc 8 is released for running down by operation of the release lever, or shutter trigger 14, the driving disc operates the pawl 19 and therefore the shutter driving ring 3, as has already been described. If at the same time the smallest diaphragm aperture corresponding to a value of "f22" has been set, as must be the case when the diaphragm control 32 is in an angular position to bring either step I or step II adjacent to the pin 41, the projection 8b strikes the pin 42 and moves the blade 35 from its starting position, as shown in FIGS. 3 and 4, to the alternative position shown in FIG. 5. In this position the blade 35 completely covers the small aperture formed by the lamellae 31 so as to prevent any light from passing through the aperture to the film. The blade 35 is kept in this position by the arcuate outer edge 8c of the driving disc which prevents the pin 42 from moving back to its original position under the force of the spring 39.

To consider the situation for a setting of 1/2000 of a second and a diaphragm value of "f22," as illustrated in FIGS. 3–5, the pin 41 of the lever 37 that carries the blade 35 engages step I of the cam 32a. This holds the blade 35 very close to the edge of the diaphragm aperture so that the blade has only a very small distance to move in order to close this aperture when the blade is released by the operation of the driving mechanism that drives the regular shutter blades 4.

When a slightly longer exposure of 1/1000 second, which can still only be accomplished at a diaphragm value of "f22," is desired the control 32 must be set so that the pin 41 engages step II of the cam 32a. This permits the blade 35 to pivot slightly farther away from the edge of the aperture than was described before. As a result, the blade 35 must travel a somewhat longer path before it can cover the small aperture and block off light which would otherwise reach the film. As a result, the diaphragm aperture is blocked off slightly later than when the diaphragm control 32 is set at step I.

When the diaphragm control 32 is set at one of the diaphragm values of the scale 33, the blade 35 must be moved out of the way since it is no longer required to be used. This position of the blade 35 is shown in FIG. 6 and corresponds to a setting of the control 32 in such a position that the pin 41 rests against step III of the cam 32a. Moreover, the pin 42 is moved out of the path of motion of the projection 8b so that the blade 35 is not actuated by rotation of the driving disc 8.

Whereas, in the embodiment shown in FIGS. 3–6 the extremely short exposure times are achieved by having the extra shutter blade 35 close off the small diaphragm aperture shortly after that aperture is opened up by the regular shutter blades 4, in the embodiment in FIG. 7 the regular shutter blades 4 are, in effect, not part of the shutter operation during the shortest exposure times of the range 34. This is because of the fact that the additional shutter blade 35', which is pivotally mounted on a lever 37', occupies a starting position that covers the small diaphragm aperture prior to the time that the shutter trigger is actuated. The regular shutter blades 4 also cover the aperture at the same time but, as will be described hereinafter, the regular shutter blades uncover the aperture before the additional shutter blade moves to a position in which it also uncovers the aperture.

The additional shutter blade 35' has an opening 45 which passes in front of the small diaphragm aperture in order to uncover the latter for the necessary brief interval of time to make the highest speed exposures. The opening 45 may have the form of a triangle and may, in fact, be formed by edges of two separate parts of the additional shutter blade means. The lever 37' on which the additional shutter blade 35' is mounted can be pivoted so as to bring the additional shutter blade 35' into different starting positions corresponding to different high speeds of shutter operation. This movement of the lever 37' is accomplished by means of the diaphragm control 32 so that when the shortest exposure time, or highest shutter speed, is desired, the pin 36' about which the additional shutter blade 35' pivots is moved closer to the center of the diaphragm aperture so that the narrow part of the triangular aperture 45 passes across the diaphragm aperture to uncover it for the briefest possible period of time. When it is desired to have a longer exposure (although still extremely short), the lever 37 is pivoted so as to move the pin 36' slightly farther away from the optical center of the diaphragm aperture, thus causing the wider portion of the triangular aperture 45 to move across the diaphragm aperture. In this way, the diaphragm aperture is uncovered for a somewhat longer interval of time. Movement of the lever 37' and, hence, of the initial position of the additional shutter blade 35' is controlled by means of the pin 41' that extends from the lever 37' and acts as a cam follower to follow steps I, II, and III of the cam edge 32a of the diaphragm control 32.

In operation, if the diaphragm control 32 of the embodiment of FIG. 7 is set to produce an exposure of 1/2000 second at a diaphragm aperture of "f22," which corresponds to the setting illustrated in FIG. 7 with the pin 41' resting on step I, the additional blade 35' is located ahead of the diaphragm aperture. When the cocked driving disc 8 is released for running-down, the projection 8b impinges on the pin 42' of the additional shutter blade 35' and rotates the latter against the force of the coil spring 39', thus causing the narrower portion of the aperture 45 to sweep across the diaphragm aperture to uncover the diaphragm aperture briefly. As in the previous embodiment, the additional blade 35' is held in the covering position by the edge 8c of the driving disc 8 after the exposure is completed because the pin 42' continues to engage the edge 8c until the driving disc 8 is returned to its cocked position. When the shutter is recocked, the spring 39' forces the shutter blade 35 back into its original position in contact with a fixed pin 48.

When the diaphragm control 32 is moved so as to bring about an exposure of 1/1000 second at a diaphragm aperture of "f22," the pin 41' will be in contact with step II of the cam 32a. This permits the lever 37' to pivot and to bring the pivot pin 36' farther away from the optical center of the lens so that when the driving disc 8 runs down, the small diaphragm aperture will be uncovered for a slightly longer time while the wide portion of the aperture 45 crosses the diaphragm aperture.

If the diaphragm control 32 is set at any of the positions along the scale 33, which is the same scale shown in FIGS. 1 and 2, the pin 41' engages step III of the control cam 32a, thus permitting the lever 37' to rotate about the fixed pin 38' under the influence of a spring 39a so as to move the additional shutter blade 35' completely away from the lens aperture. In order to do this the additional blade 35' has a notch 48a in its edge facing the pin 48.

Instead of using an additional shutter blade for obtaining extremely short exposure times, the embodiment in FIG. 8 uses the main shutter blades 4. In this embodiment the shutter blades 4 are mounted so as to be controlled by two relatively movable bearing rings 50 and 51 and can be so positioned by these rings that the starting position of the blades initially overlaps when the blades are set for the highest speed operation at the smallest diaphragm aperture.

Specifically, in FIG. 8 the shutter blades 4 are pivotally mounted on pins 5" on the driving ring 50 which is connected to the driving disc 8 by the pawl 19 and the blades 4 are also pivotally mounted on the ring 51 by means of a pin-slot connection comprising a pin 51a and a slot 4a". The outer ring 51 has a projection 51b which fits into the forked end 52b of a lever 52 mounted on a pivot pin 53 and controlled by means of engagement between a cam follower pin 54 and a cam slot 32c in the diaphragm control 32.

As may be seen in FIG. 8, the control slot 32c comprises a section 32e which is concentric with the optical axis and is the section that engages pin 54 when the diaphragm control 32 is set at one of the diaphragm values of the scale 33 (FIGS. 1 and 2). In such diaphragm settings the shutter blades 4 occupy the starting position indicated by solid lines, from which they swing out to the full width of the lens aperture at the time that the driving disc 8 runs down in making a photographic exposure. If, on the other hand, the diaphragm control 32 is rotated clockwise so that the section 32d of the control slot engages the pin 54, the lever 52 will be rotated counterclockwise to an extent determined by the exact angular position of the control 32. Pivoting of the lever 52 causes the outer ring 51 to be rotated which, in turn, pivots the starting position of the shutter blades 4 to a position approximately as indicated in broken lines in FIG. 8. In this position the overlapping of the shutter blades 4 is increased to such an extent that, when the driving disc 8 runs down, the blades 4 swing out only slightly more than is necessary to clear the smallest diaphragm aperture, which means that the blades swing out to the position indicated by the dot-and-dash lines in FIG. 8.

In order to avoid overexposure, for example in cameras which are provided with a built-in exposure meter and coupling means that control the shutter speed and diaphragm aperture, it is expedient to have a locking device between the shutter speed control 28 and the diaphragm aperture control 32. This locking device may be arranged so that the setting of the diaphragm control member 32 in any of the additional positions included within the range 34, as shown in FIGS. 1 and 2, is possible only if the shutter speed control 28 is set at the shortest exposure time, which, in FIGS. 1 and 2, is 1/5000 second. This locking device may be an arresting lever 55 which is pivotally mounted on a pin 56 and which is biased by means of a spring 57 that causes the lever to try to rotate counterclockwise. The end of the lever may be provided with a projection 55a on one side and a stop 55b on the other side. The projection 55a is formed so that it can enter into a notch 28a on the shutter speed control 28 when the latter is set for the highest operating speed, and only when the projection 55a is nested within the notch 28a is the lever 55 rotated so as to remove the stop 55b from interfering with a stop dege 32f on the diaphragm control 32. Thus, only when the shutter speed control 28 is set for the highest normal shutter speed can the diaphragm control 32 be moved into the range 34.

I claim:

1. A photographic shutter comprising: a secondary shutter blade; a diaphragm settable to different aperture sizes; a control means connected to said diaphragm to set it at different aperture sizes; said control means having at least one additional position in which the aperture size of said diaphragm being at its smallest value; and a connection means between said blade and said control means to move said blade into operating position to move a relatively short effective distance sufficient to operate as a shutter only when said control means is set to said additional position.

2. A photographic shutter comprising: a main shutter blade; an extra shutter blade; a diaphragm settable to different aperture sizes; a control means connected to said diaphragm to set it at different aperture sizes; said control means having at least one additional position in which the aperture size of said diaphragm being at its smallest value; and a connecting means between said extra blade and said control means to move said extra blade into operating position to move a relatively short effective distance sufficient to operate as a shutter only when said control means is set to said additional position.

3. A photographic shutter comprising: a main shutter blade; an extra shutter blade having an aperture therein; a diaphragm settable to different aperture sizes; a control means connected to said diaphragm to set it at different aperture sizes; said control means having at least one additional position in which the aperture size of said diaphragm being at its smallest value; a connecting means between said extra blade and said control means to move said extra blade to cover the diaphragm aperture when said control means is set to said additional position and a driving mechanism to move said extra blade in one direction to cause said aperture therein to uncover said diaphragm aperture and to cover it up again.

4. A photographic shutter comprising: a main shutter blade; a pivotally mounted extra shutter blade having a triangular aperture therein; a diaphragm settable to different aperture sizes; a control means connected to said diaphragm to set it at different aperture sizes; said control means having at least one additional position in which the aperture size of said diaphragm being at its smallest value; a connecting means between said extra blade and said control means to move said extra blade to cover the diaphragm aperture when said control means is set to said additional position and to set the distance from the pivotal axis of said extra blade to the center of said diaphragm aperture; and a driving mechanism to move said extra blade in one direction to cause said aperture therein to uncover said diaphragm aperture and to cover it up again, the duration of time when said diaphragm aperture is uncovered being determined by the distance between the pivotal axis of said extra blade and the center of said diaphragm aperture.

5. A photographic shutter comprising: a main shutter blade; a driving mechanism therefor; an extra shutter blade; a diaphragm settable to different aperture sizes; a control means connected to said diaphragm to set it at different aperture sizes; a connecting means between said extra blade and said control means to move said extra blade into position to engage said driving mechanism, only when said control means sets said diaphragm to its smallest aperture, to drive said extra blade over the diaphragm aperture to cover it up in a predetermined short interval of time after said main shutter blade has uncovered the diaphragm aperture in making a photographic exposure.

6. A photographic shutter comprising: a main shutter blade; a driving mechanism therefor; an extra shutter blade pivotally mounted on a pivotally mounted lever; a diaphragm settable to different aperture sizes; a control means connected to said diaphragm to set it at different aperture sizes, said control means having at least one additional position beyond the range of positions corresponding to the different aperture sizes, the aperture size of said diaphragm being at its smallest value when said control means is set in at least one of said range of positions and when said control means is set to said additional position; a pin on said blade; a connecting means between said lever and said control means to move said extra blade into position adjacent the diaphragm edge defining the smallest diaphragm aperture, said connecting means simultaneously moving said pin in position to engage said driving mechanism.

7. A photographic shutter comprising: a main shutter blade; a driving mechanism therefor; an extra shutter blade pivotally mounted on a pivotally mounted lever; spring means biasing said extra blade against said lever when said extra blade is in its starting position; a diaphragm settable to different aperture sizes; a control means connected to said diaphragm to set it at different aperture sizes, said control means having at least one additional position beyond the range of positions corresponding to the different aperture sizes, the aperture size of said diaphragm being at its smallest value when said control means is set in at least one of said range of positions and when said control means is set to said additional position; a pin on said blade; a connecting means between said lever and said control means to move said extra blade into position adjacent the diaphragm edge defining the smallest diaphragm aperture, said connecting means simultaneously moving said pin in position to engage said driving mechanism.

8. A photographic shutter comprising: a main shutter blade; a driving mechanism therefor; an extra shutter blade pivotally mounted on a pivotally mounted lever; spring means biasing said extra blade against said lever when said extra blade is in its starting position; a diaphragm settable to different aperture sizes; a control means connected to said diaphragm to set it at different aperture sizes, said control means having at least one additional position beyond the range of positions corresponding to the different aperture sizes, the aperture size of said diaphragm being at its smallest value when said control means is set in at least one of said range of positions and when said control means is set to said additional position; a cam operated by said control means; a pin on said blade; a cam follower connecting said lever to said control means to move said extra blade into position adjacent the diaphragm edge defining the smallest diaphragm aperture, said cam follower simultaneously moving said pin in position to engage said driving mechanism.

9. A photographic shutter comprising: a diaphragm settable to different aperture sizes; a control means connected to said diaphragm to set it at different aperture sizes; said control means having at least one additional position in which the aperture size of said diaphragm being at its smallest value; a pair of mutually movable members; a secondary shutter blade pivotally mounted on both of said members; and a connecting means between said control means and one of said members to move it relative to the other member to shift the starting position of said blade so that said blade pivots through a relatively short effective path to uncover and recover the diaphragm aperture when said control means is set to said additional position.

10. A photographic shutter comprising: a diaphragm settable to different aperture sizes; a control means connected to said diaphragm to set it at different aperture sizes; said control means having at least one additional position in which the aperture size of said diaphragm being at its smallest value; a pair of mutually rotatable rings; a secondary shutter blade pivotally mounted on both of said rings; and a connecting means between said control means and one of said rings to rotate it relative to the other ring to shift the starting position of said blade so that said blade pivots through a relatively short effective path to uncover and recover the diaphragm aperture when said control means is set to said additional position.

11. In a device of the character described, a diaphragm aperture control means; a shutter speed control means, and a lock means engaging both of said control means to prevent said diaphragm aperture control means from being moved into a predetermined portion of its range of positions, all corresponding to the smallest diaphragm aperture size, until said shutter speed control means is moved into its highest speed setting.

References Cited by the Examiner
UNITED STATES PATENTS

| | | | |
|---|---|---|---|
| 2,232,969 | 2/1941 | Ranft | 95—63 |
| 2,980,003 | 4/1961 | Draghi et al. | 95—63 |
| 3,084,605 | 4/1963 | Kremp et al. | 95—10 |

NORTON ANSHER, *Primary Examiner.*

CLIFFORD B. PRICE, *Assistant Examiner.*